Sept. 18, 1923.
J. A. HOLIFIELD
ARC WELDING APPARATUS
Original Filed May 9, 1921
1,468,158
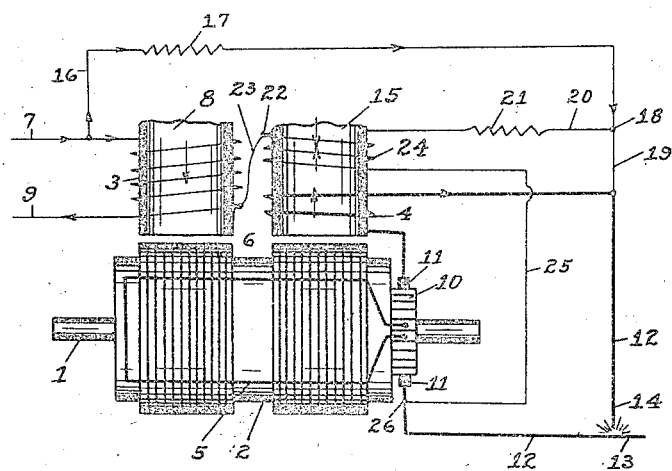
INVENTOR
J. A. Holifield.
BY
ATTORNEY Patented Sept. 18, 1923.

1,468,158

UNITED STATES PATENT OFFICE.

JOSEPH A. HOLIFIELD, OF MOBILE, ALABAMA, ASSIGNOR TO WHITE FUEL OIL ENGINEERING CORPORATION, OF NEW YORK, N. Y., A CORPORATION OF NEW YORK.

ARC-WELDING APPARATUS.

Application filed May 9, 1921, Serial No. 467,645. Renewed June 29, 1923.

*To all whom it may concern:*

Be it known that I, JOSEPH A. HOLIFIELD, a citizen of the United States of America, residing at Mobile, in the county of Mobile and State of Alabama, have invented certain new and useful Improvements in Arc-Welding Apparatus, of which the following is a specification.

This invention relates to an arc welding apparatus, and has for its object to modify and improve for certain uses the twin field type of self-regulating generator for arc welding circuits which forms the subject matter of my pending application, Serial No. 454,277, filed the 21st day of March, 1921, wherein I have described and claimed a generator comprising a single armature and commutator with twin independent sets of fields, one set separately excited by a substantially constant potential D. C. current, and the other set differentially excited by a series current from the generator itself, the constantly excited fields being wound to exert a predominating magnetic influence on the armature which is opposed more or less according to the resistance in the arc by the magnetic influence of opposite polarity of the series fields. The result is that the sum of the magnetic influence of the twin fields is to generate or induce a current flow which, within the normal elastic limits of the arc, will automatically maintain a substantially constant current of wattage in the arc.

In my present invention I contemplate the use of twin fields excited as above described, and in addition thereto I provide in the series wound set of variably excited fields a reversing winding so connected that under open circuit condition it bucks the series windings and under working conditions it boosts the series windings of the variably excited set of fields. The advantage of this arrangement is that it makes the regulating function of the generating apparatus more sensitive.

As illustrative of my invention, I have shown diagrammatically in the accompanying drawings which form a part of this specification, a typical twin field generating and self regulating arc welding apparatus in which 1 is a shaft driven by any suitable source of power and having mounted thereon an armature 2 which is elongated to permit its co-action with the twin sets of fields 3 and 4 which are independent of each other and disposed to exert their joint magnetic influence at the same time upon the same coil of the armature windings, which is typically illustrated at 5. The armature core is preferably designed with a gap 6 between the independent sets of poles, which is preferable but not essential.

Current from any substantially constant potential D. C. source is supplied by a conductor 7 to the field windings 3 surrounding the poles 8 of the constantly excited set of fields, the current returning over conductor 9. The generator has any standard type of commutator 10 connected in any normal manner with the armature windings 5 and has its brushes 11 connected in series with the arc circuit 12, which includes in series therein the manually controllable electrodes 13 and 14 and the field windings 4 surrounding the poles 15 of the other or variably excited set of fields. The twin parallel sets of fields 3 and 4 are so wound as to produce, under operating conditions, opposed polarity and they should be so wound and proportioned as to cause a predetermined flow of current through the arc circuit 12 when in service. By a branch circuit 16 I divert current from the conductor 7 through a resistance 17 to the junction point 18 which is connected by a circuit 19 with one side of the arc circuit 12. From the junction 18 a circuit 20, having therein a resistance 21, is connected to a junction point 22 where one branch 23 connects to the conductor 9 and the other branch is connected through windings 24 on the poles 15 of the fields 4 to a circuit 25 which in turn is connected to the opposite side of the arc circuit 12 from circuit 19.

In operation, with the arc circuit open, no appreciable current will flow through the field windings 4, but current will flow collectively from the exciting circuit 7 by circuit 16 past resistance 17, and from the generator through circuit 19 to the junction point 18 and thence over circuit 20 past resistance to the junction point 22 where it will branch, part returning through circuit 23 to conductor 9 and part flowing through the field windings 24 so as to magnetize the cores 15 of the variably excited set of fields 4 with the same polarity as the cores 8, and thereupon the two fields will exert the sum of their magnetic influence collectively on the windings of the armature and will increase the voltage of the machine. Upon striking the arc, current immediately flows through the fields 4 and, there being less resistance in the arc circuit than in the circuit 19, 20, this current will practically all flow through the arc circuit and thereupon the current flowing through circuit 16 will also flow from junction 18 over wire 19 instead of 20 and thus the two currents will flow collectively through the arc circuit 1 to the junction point 26 where the exciting circuit will branch, returning over circuit 25 in a reverse direction through field windings 24 to the junction point 22 and thence by circuit 23 to conductor 9. When this occurs the polarity of the windings 24 is reversed and they will boost the action of the windings 4, which lowers the armature voltage by decreasing the predominance of the coils 3. The result is to produce a substantially constant current or wattage at the arc.

Having thus described my invention, what I claim as new and desire to secure by Letters Patent, is:—

1. An arc welding apparatus comprising twin fields of opposite polarity when the arc is struck, one separately excited and one a series wound field responsive to the current flow at the arc, a commutator in series with said latter field, an armature having its windings jointly and simultaneously influenced by said twin fields, armature brushes, a reversing winding in the series field, and circuit connections to reverse the current flow through said reversing winding to cause it to boost the series winding when the arc is struck.

2. An arc welding apparatus comprising twin fields of opposite polarity when the arc is struck, one separately excited and one a series wound field responsive to the current flow at the arc, a commutator in series with said latter field, an armature having its windings jointly and simultaneously influenced by said twin fields, armature brushes, a reversing winding in the series field, and circuit connections to reverse the current flow through said reversing winding to cause it to boost the series winding when the arc is struck, said series and reversing windings being both responsive to the variable resistance at the arc.

3. An arc welding apparatus comprising twin fields of opposite polarity when the arc is struck, one separately excited and one a series wound field responsive to the current flow at the arc, a commutator in series with said latter field, an armature having its windings jointly and simultaneously influenced by said twin fields, armature connections to reverse the current flow through said reversing winding to cause it to boost the series winding when the arc is struck, said series and reversing windings being both responsive to the variable resistance at the arc, and said reversing winding being connected in parallel with the separately excited field and across the welding armature brushes.

4. In an arc welding apparatus, an armature having a single commutator and brushes, an arc circuit in series with the brushes, twin sets of fields for said armature, a circuit for separately exciting one set of fields, a series winding for oppositely exciting the other set of fields, a reversing winding in the series fields, a parallel circuit branched from the separate exciting circuit and having therein a resistance, a branch circuit connecting said parallel circuit with one side of the arc circuit, and a branch circuit connecting the other side of the arc circuit to said parallel circuit and having included in series therein the said reversing winding.

In testimony whereof I affix my signature.

JOSEPH A. HOLIFIELD.

Witness:
NOMIE WELSH.